2,744,022

PLASTER COMPOSITIONS AND PRODUCTS

Michele Croce, Narberth, and Clarence G. Shuttleworth, Paoli, Pa., assignors to Certain-Teed Products Corporation, Ardmore, Pa., a corporation of Maryland No Drawing. Application July 30, 1952,
Serial No. 301,809

6 Claims. (Cl. 106—110)

This applicaiton is a continuation in part of our co-pending application Serial No. 238,782, filed July 26, 1951, now abandoned.

This invention relates to gypsum plaster composition and products made therefrom, and particularly the invention relates to such compositions and products thereof whereby increased protection against fire is attained.

In the patent to Michele Croce No. 2,526,066 patented October 17, 1950, there is disclosed a gypsum plaster composition and product whereby an unusually high resistaance to the heat of the fire is attained, such plaster composition and product attaining this improved fire resistance characteristic through the cooperating action of unexpanded vermiculite incorporated in the plaster in a relatively small percentage along with a small percentage of a non-combustible fiber such as asbestos. While the manner in which this composition functions is disclosed in detail in the aforesaid Croce patent, it may be pointed out that the primary reason for the improved resistance to the action of the fire is that the expansion of the vermiculite when heated by the fire is such as to substantially compensate for the inherent shrinkage of the gypsum component of the composition as such gypsum component is progressively calcined and thermal insulation as the vermiculite expands. As pointed out in the aforesaid Croce patent, the inclusion of the non-combustible fiber in the plaster composition is for the purpose of preventing flaking or spalling of the vermiculite as such vermiculite is expanded due to the heat of the fire, it being noted that such spalling, unless restrained by the action of a bodying fiber, would take place in a progressive manner so as to destroy the wall within a relatively short time in the event that no such bodying fibers were present.

The gypsum plaster composition disclosed in the aforesaid Croce patent has been commercially used primarily for the production of gypsum wallboard wherein the usual paper liners or facing members are employed upon opposite sides of a core made from the composition described in the aforesaid Croce patent, and as thus used the resulting wallboard has met with exceptional success in attaining exeremely high fire endurance ratings in tests conducted at the Underwriters' Laboratories at Chicago, Illinois, such tests being conducted upon ceilings as well as load bearing partitions according to standard methods of fire tests of building construction and materials.

Despite such success of the gypsum plaster composition described in the aforesaid Croce patent, it is the primary object of the present invention to enable further increases in fire resistance to be attained by plaster composition materials and products of the general character shown in the Croce patent, and to attain such improvements in a way that not only facilitates manufacture but also reduces the manufacturing cost.

One of the primary reasons why gypsum plaster walls afford an effective means for retarding the progress of the fire is that the set gypsum plaster contains somewhat over 20% of chemically combined water which is many times referred to as the combined water in the set plaster, and when such a plaster wall is attacked by a fire, the actual wall temperature cannot become excessively high until substantially all of the combined water in the plaster has been driven off by what amounts to a process of calcination of the plaster. With this in mind, it is evident, of course, that where a gypsum plaster composition is employed that includes foreign or additive materials other than plaster, the foreign materials are added in such instance at a material sacrifice insofar as the ultimate combined water content of the final wall may be concerned, and it is a further and important object of the present invention to enable the plaster content of a fire retardant plaster composition such as that of the aforesaid Croce patent to be materially increased, and objects related to the foregoing are to enable the required fiber content in plaster compositions of the aforesaid character to be materially reduced so as to thereby permit a substantial increase in the gypsum plaster content of such compositions; to enable the non-combustible fiber content in such gypsum plaster compositions to be afforded by non-combustible fibers that may be readily easily and thoroughly dispersed in such compositions.

In the commercial production of plaster wallboard in accordance with the disclosure of the aforesaid Croce patent, it has been determined that the most advantageous results are obtained when the non-combustible fiber is afforded by 2% of asbestos fiber, it having been found that the use of blown glass fiber or glass wool as described in such patent introduced manufacturing difficulties in some instances because of the tendency of such glass wool to form into lumps or balls in the course of the mixing of the gypsum slurry. In such use of asbestos as the non-combustible fiber in wallboard made under the aforesaid Croce patent it is found that the asbestos absorbs excessive amounts of water during the mixing operation so that in order to obtain a workable consistency in the slurry it is necessary to add considerable water over and above the amount of water that would be required if the asbestos were not employed. Such additional mixing water must of course be removed in the course of the drying operation, and this is objectionable. It is, therefore, another important object of the present invention to enable the fiber content to be afforded in vermiculite-plaster compositions in such a way as to minimize the amount of mixing water that must be employed. More specifically it is an object of the present invention to enable glass fibers to be readily and easily employed in gypsum plaster compositions of the general type disclosed in the aforesaid Croce patent, and to utilize such glass fibers in such a way that these glass fibers attain what amounts to a complete and uniform dispersion throughout the mass of a cast made from such composition.

The composition and product of the present invention, as pointed out hereinabove, constitute an improvement on the composition and product disclosed in the aforesaid Croce Patent No. 2,526,066, and is a broad sense the composition of the present invention comprises calcined gypsum plaster, comminuted unexfoliated vermiculite so proportioned by its size, quality and relative quantity as to afford an inherent expansion which will substantially equal the shrinkage of the set gypsum under the action of a fire, and a bodying fiber content afforded in most instances by an extremely minute proportion of drawn textile glass fibers cut into short lengths and capable of substantially complete dispersion in the composition as such compoistion is mixed into a slurry form. In respect to the relative quantity, the quality and the fineness or grading of the vermiculite component of the composition, the disclosure of the aforesaid Croce patent is directly applicable to the present invention, and is by reference incorporated herein in all its detail.

Considering first the variations of size or grading, quality and relative quantity of the vermiculite group, that is used as the heat-expansible component of the composition, it is known that such minerals from different sources expand in different amounts, and that the effective expansion of such minerals, regardless of source, varies with the degree of comminution of such mineral. Since the heat-expansible mineral is incorporated in the plaster composition for the purpose of counteracting the shrinkage of the gypsum plaster component under the action of fire, but without objectionably exceeding such shrinkage, it follows, as taught by the aforesaid Croce patent, that the proportion of the vermiculite component must vary in accordance with the size and the quality or source of the mineral that is used. In the absence of any known formula for expressing the relationship between the size, quality and relative quantity factors as applied to the vermiculite component, this relationship has been defined functionally in the aforesaid Croce patent by reference to the amount of the total expansion attained by "high-grade" vermiculite of a particular size or grading and within specified limits of percentage.

Thus it was found as explained in the aforesaid Croce patent, the vermiculite from the mines at Libby, Montana, had a greater expansion than vermiculite from any other known source, and the vermiculite from this particular source was, therefore, designated as being "high-grade"; and in the Croce patent it was taught that expansion within the required limits could be attained through the use of such high-grade vermiculite in a percentage of from 2½% to 10% and in a minus 28 mesh commercial grading. The phrase "Minus 28 mesh commercial grading" is to be taken as meaning material ground by usual grinding processes to a degree such that all of the material will pass through a usual 28 mesh testing sieve. This teaching was then utilized in the claims of the aforesaid Croce patent to define and relate the various factors pertaining to the vermiculite component as follows:

"the degree of comminution of the mineral of the vermiculite group and the grade and amount of such mineral used being such that when the cast made from such mixture is heated to a high temperature the expansible mineral in the cast shall have about the same total amount of expansion as would 3½% to 7½% of high-grade vermiculite of minus 28 mesh commercial grading,"

At the outset it should be noted that suggestions have heretofore been made concerning the use of glass fibers, glass wool or mineral wool in hydraulic cement mixtures or gypsum plaster mixtures for reinforcing or strengthening purposes, or as in the aforesaid Croce patent, for the purpose of retaining the expanding vermiculite in place in a cast, but such prior suggestions along this line have been found to be unworkable in a commercial sense, particularly insofar as to plaster molds, casts, walls and wallboard were concerned. This impracticability of such prior suggestions has resulted from the tendency of the glass fibers or mineral wool to form agglomerate masses or balls in the mixed plaster or slurry, as contrasted with the desired dispersal of the fibers uniformly throughout the mixture. In contrast to such objectionable action of glass wool or mineral wool as suggested in the prior art, the present invention attains substantially complete and uniform dispersal of glass fibers in gypsum plaster slurry so as to thereby attain a radical improvement in the desirable physical characteristics of the resulting casts, and this is attained at a relatively low cost and in such a way as to simplify and facilitate the manufacturing and other operations involved in the mixing and forming of the slurry.

Glass fibers may be classified generally in two main categories or groups as blown glass fibers or as drawn textile glass fibers, and while these classifications are based upon the method of production of the fibers, there also are many definite and important distinctions between such groups as to physical characteristics and properties of the fibers as well as in the relationship of the individual fibers to each other. Thus, blown glass fibers are formed by steam blowing of a molten glass stream to attenuate the stream into small diameter fibers, and such fibers take a form known generally as glass wool or mineral wool in that the fibers are not straight and are interlaced in a random relation with each other. The fiber length may vary considerably in such glass wool, and separation of individual fibers from the mass is quite difficult because of the curled and interlaced or matted relationship of the fibers in the mass. Such separation of individual fibers from the mass is also rendered difficult by reason of the relatively physical strength characteristics of the blown fibers which bend quite easily and tend either to retain their bent form or to break at the bend.

The drawn textile glass fibers are on the other hand produced as continuous filaments, each of which is discharged in a molten state through an orifice and is attenuated by winding on a high speed winding drum. In the production, winding and handling of drawn glass fibers or filaments it is essential that a great many such extremely fine filaments be grouped into strands each containing from one hundred to several hundred individual filaments so that the forces that are necessarily involved in the high speed handling will not cause breakage of the filaments. Because of such grouping, the abrasive character of the glass makes it necessary as a practical matter to apply a protective coating to such filaments to prevent abrading action between the several grouped filaments of each strand. Such protective coating material is usually termed the "bonding" material although the actual bonding action where very small quantities of binder are used or in the case of some of the commonly used coating materials such as a starch coating is relatively slight, so that the fibers or filaments may in such instances be said to be loosely bonded or loosely associated. In other instances, the coating material may be of such a character or may be used in such quantities as to hold the filaments of the strand quite permanently together and some thermoplastic resins when used as the bonding material act to produce such a strong bond in the strand.

Under the present invention, resort is had to the use of the more costly drawn textile glass fibers that are loosely bonded or loosely associated and by attaining complete dispersion of such fibers in the mixture in the manner described hereinafter, the full strengthening and bodying effect of each of the individual fibers is realized with the net effect that the quantity or proportion of the drawn glass fibers is minimized and the use of the costly fiber is rendered practical in an economic sense.

The drawn glass fiber component of the plaster composition is afforded by a small percentage of drawn textile glass strands cut into short lengths and incorporated in the gypsum plaster, and such glass fibers are of such a character that they will separate and attain an almost complete or individual dispersion of the individual filaments as a slurry is formed from the plaster composition. Such drawn glass fibers, of course, may be of different diameters but are in any event extremely small or fine. Thus, fibers having a diameter of about 0.00024 inch to about 0.00038 inch which are commercially available, has been found to be highly effective as will be described in detail hereinafter.

The glass fiber material utilized under the present invention is one which is loosely bonded or associated into strands as by a bonding material that is water softenable or water soluble in character, and the strands are cut into short lengths, within the range of ¼ inch to one inch so as to afford short sections or bundles of fibers, each bundle being formed by a cut length of a strand, and it has been found that a length of about one-half inch is very satisfactory. Under the present invention the binder is afforded by a water softenable or a water soluble material such as a starch material or water softenable resins, and it is found that with such a binder the individual filaments which make up each bundle or short section of strand tend to remain together in their bundle in the course of a short dry-mixing operation with the other components of the plaster composition, although there is a substantial separation of the filaments from their bundles as such dry-mixing progresses.

In this short bundle-like form, the strength and resilience of the bundles and of the fibers is sufficiently high to prevent breaking of the strand or the individual fibers or filaments by the forces that may be applied thereto in a mixing operation. Moreover, the strength and springiness of the individual fibers and the bundles as compared to the forces that may be applied thereto in a dry or wet mixing operation with the plaster is sufficient to prevent the formation of swirls, balls or agglomerate masses. Hence, a mixing operation that is applied to a composition which includes relatively short bundles of loosely bonded drawn glass fibers as aforesaid is effective primarily to produce uniformity of distribution of the bundles and individual fibers throughout the mass of material. As hereinabove pointed out, the dry mixing operation does in fact cause separation of individual fibers or small groups of fibers from the bundles, but such action is relatively slow so long as the water soluble or water softenable binder is not subjected to the action of water. Such dry-mixing may, of course, be carried on until the fibers have been completely separated from their bundles and completely dispersed in the dry mix, but this is usually considered unnecessary in view of the ease of dispersion in the final wet mix. The preliminary distribution of the bundles and individual glass fibers in a short dry mixing operation serves, however, to simplify small batch usage of the mixture, as well as to simplify the wet mixing operation and when the water is fed into the plaster composition in the wet mixer, the action of the water immediately dissolves or softens the binder to such an extent that relatively short wet mixing operation performed, for example, in a continuous mixer causes practically complete separation of the individual drawn glass fibers from their bundle form so that such individual glass fibers are almost completely dispersed in a uniform manner throughout the body of the slurry. Then in the molding or casting operation the individual glass filaments are uniformly located throughout the mass with what might be termed a random dispersion as to relative direction within the cast, and it is by reason of this thorough dispersion and the random relationship of the direction of the individual fibers that the fibers form a skeletal mat-like retaining structure which effectually prevents spalling of the expanding vermiculite in case of a fire.

The percentage by weight of loosely bonded drawn glass fiber used under the present invention is from 0.03% to 1.00% with from 3½ to 7½% of high grade vermiculite in a minus 28 mesh commercial grading and with the balance of the composition being afforded by calcined gypsum plaster; and the length of fibers may be varied between about ¼ inch and one inch, and it is to be understood of course, that the present invention contemplates the use of small added quantities of retarders, accelerators, starches or core adhesives and the like in accordance with usual practice, as well as the addition of weight reducing foam and core adhesive when the present invention is employed in the manufacture of gypsum wallboard or like products.

Under the present invention it has been discovered that the bodying fiber content in fire retardant compositions of the character discussed above may be afforded by from three-hundredths of one percent (0.03%) to three-tenths of one percent (0.3%) of drawn textile glass fiber cut into short lengths as above described. Thus, compositions including a control sample made according to the Croce patent, have been made and tested in accordance with the following table.

| Formula No. | Ingredients—Percent | | | Tests in ½ Inch Slabs | | |
| --- | --- | --- | --- | --- | --- | --- |
| | ¼" bundles Drawn Glass Fibers as described | High Grade minus 28 mesh Raw Vermiculite | Plaster | Change in Caliper when Heated to 1,300° F. | Pull Test 1 in. strip with 300 gm. wt. at 1,500° F. | Spalling when heated to 1,300° F. |
| 1 | 0.1 | 3½ | 96.4 | Minus .011 | 30 Min.+ | None. |
| 2 | 0.05 | 3½ | 96.45 | Minus .009 | 30 Min.+ | Slight. |
| 3 | 0.03 | 3½ | 96.47 | Minus .013 | 30 Min.+ | Do. |
| 4 | 0.02 | 3½ | 96.48 | Too Fragile to handle. | 8 Min.+ | Considerable. |
| 5 | 0.1 | 7.0 | 92.9 | Plus .030 | 30 Min.+ | None. |
| 6 | 0.05 | 7.0 | 92.95 | Plus .079 | 30 Min.+ | Considerable. |
| 7 | 0.03 | 7.0 | 92.97 | Too Fragile to to handle. | 12 Min.+ | |
| 8 | 0.02 | 7.0 | 92.98 | do. | | |
| C-1 | Asbestos 2.0 | 3½ | 94.5 | Minus 0.010 | 30 Min.+ | None. |

Consideration of the foregoing table with particular reference to the included test data shows that the percentage of drawn glass fiber must be increased with the increase in the percentage of vermiculite, and it further shows that within the operable range of the vermiculite component, the critical lower limit of the drawn glass fiber component is substantially .03 percent. It is important to note that even at the maximum vermiculite content of 7 percent, the use of but 0.1 percent of drawn gass fiber controls the spalling of the vermiculite, while with a low vermiculite content of 3½ percent, such control is attained by .03 percent of drawn glass fiber.

Another important advantage attained is that of reducing the amount of mixing water required, it having been determined that with any of the formulae from 1 to 8, the amount of mixing water is substantially 15% less than with formula C-1 which contains 2% of asbestos. This of course greatly reduces the drying time of casts made from the composition.

The plaster composition of the present invention may of course have the desired retardants, accelerators and the like added thereto according to usual practice, and the same is true in respect to weight reducing materials such as foam which is particularly desirable in the making of plaster wallboard. The composition may of course be used in producing lath and plaster walls in the conventional way where a plaster surfacing made from the above described composition is shown as applied to lath of the usual kind and construction.

Plaster wallboard may also be made having paper covers or liners enclosing a core made from the composition of the present invention, and in making such wallboard it is to be noted that the usual small percentage of core adhesive may be incorporated in the slurry used in forming the core, in accordance with usual practice in the wallboard art in order to assure firm bond of the liners with the core. The slurry used in making the plaster wallboard may also contain the usual amount of weight-reducing foam.

The unusual effectiveness of extremely small percentages of drawn glass fiber in attaining high fire endurance rating in plaster wallboard was shown by comparison of similar boards made in ⅝ inch thickness and subjected to similar ceiling tests for fire endurance rating at the Underwriters' Laboratories, Inc. in Chicago. Such ⅝ inch wallboards each contained 3½% of high-grade unexpanded vermiculite of minus 28 commercial grading, together with the usual proportion of core adhesive and weight-reducing foam, while the first such board contained 2% of 5R asbestos and the second such board contained 0.2% of drawn textile glass fiber cut to ½ inch lengths and originally bonded by a water softenable binder.

These boards were subjected to similar fire rating tests for ceiling use, and it was found that while the board containing asbestos would not attain a rating of one hour fire resistance, the second board which contained drawn textile glass fiber as aforesaid attained a rating of slightly over one hour. In these tests it was noted that, in the ceiling made from such second board, the board remained intact on the ceiling for about ten minutes longer than the first board.

The fact that the plasterboard made under the present invention remained intact and in place for an additional ten minute period is of course an important factor, and a study of the board thus tested has shown that despite the great heat of the fire in the test, the drawn textile glass fibers in substantially the upper or back half of the board were still intact, while such fibers in the lower or front side of the board were not perceptible to any marked extent and had been melted as the fire progressed. The glass fiber in the lower or front half of the board had, however, retained its strength and form during the earlier stages of the fire while the expansion of the vermiculite was taking place, thus to hold such expanding vermiculite and the adjacent plaster against spalling, and thus an insulating zone, including the expanded vermiculite was built up in the lower or front half of the board which served to protect the fiber in the upper or rear half of the board. The glass fiber in the upper or rear half of the board thus retained its full reinforcing and strengthening function so as to maintain the board intact for an increased period of time. The board thus serves as a fire curtain for an increased period, and the expanded vermiculite in the lower or front zone of the board serves as an improved heat insulating barrier to retard temperature rise on the remote or back side of the board or partition.

In the board that was thus tested, the amount of drawn textile glass fiber was quite small, that is 0.2 percent, and this amount was sufficient to hold 3½ percent of minus 28 mesh high grade vermiculite against spalling. In view, however, of the continued reinforcing action of each glass fiber that occurs as hereinabove described an even greater resistance to the action of a fire may be attained, where this is desired, by increasing the drawn textile glass fiber content of the mixture over and above the amount required to prevent spalling. Such increase may be carried up to about one percent of drawn textile glass fiber without adversely affecting the mixing and handling operations. Such an increase in the fiber content acts to increase the strength of a plasterboard or the like, and when the exposed face of the board is subjected to a fire, the rear portions of the board, in which the fiber is protected and remains intact as described hereinabove, possess increased strength so as to cause the board to remain intact for an even longer time.

Thus it will be apparent that the present invention enables high fire endurance in plaster casts to be attained in such a way that manufacture of cast plaster products is materially simplified, and this result is attained at a cost which is materially less than could heretofore be attained.

We claim:

1. A composition convertible by water addition into a settable plastic mass, said composition consisting essentially of calcined gypsum plaster, comminuted unexpanded vermiculite and sections of textile glass fiber strands, the length of said sections of textile glass fiber being between one quarter inch and one inch and comprising not substantially less than .02% and not substantially more than 1.0% by weight of the total weight of said unexpanded vermiculite, said textile glass strands and said calcined gypsum plaster, each of said sections of textile glass fiber strands being composed of a plurality of individual textile glass filaments bonded together in substantially parallel relationship in said strand by a water softenable binder, said binder being sufficiently weak to enable substantial separation of said strands into individual filaments throughout said plaster as an incident to the agitation of said composition with water, the particular degree of comminution and the grade and amount of said unexpanded vermiculite being such that when heated to the calcining temperature of said gypsum plaster said vermiculite shall have substantially the same total amount of expansion as would 3½% to 7½% of high grade vermiculite of minus 28 mesh commercial grade.

2. A composition convertible by water addition into a settable plastic mass, said composition consisting essentially of calcined gypsum plaster, high grade comminuted unexpanded vermiculite of about minus 28 mesh commercial grading and sections of textile glass fiber strands, the length of said sections of textile glass fiber being between one quarter inch and one inch and comprising not substantially less than .02% and not substantially more than 1.0% by weight of the total weight of said unexpanded vermiculite, said textile glass fiber strands and said calcined gypsum plaster, each of said sections of textile glass fiber strands being composed of a plurality of individual textile glass filaments bonded together in substantially parallel relationship in said strand by a water softenable binder, said binder being sufficiently weak to enable substantial separation of said strands into individual filaments throughout said plaster as an incident to the agitation of said composition with water, said high grade comminuted unexpanded vermiculite comprising not substantially less than 3½% and not substantially more than 7½% by weight of the total weight of said unexpanded vermiculite, said textile glass fiber strands and said calcined gypsum plaster.

3. A plaster cast consisting essentially of set gypsum plaster, said set gypsum plaster containing dispersed therein comminuted unexpanded vermiculite and textile glass filaments, the particular degree of comminution and the grade and amount of said vermiculite being such that when the cast made from such mixture is heated to a high temperature the vermiculite in the cast shall have about the same total amount of expansion as would 3½% to 7½% of high grade vermiculite of minus 28 mesh commercial grade, said textile glass filaments having a length not substantially less than one quarter inch and not substantially greater than one inch and being distributed substantially uniformly as individual filaments throughout said set gypsum plaster and comprising not substantially less than .02% and not substantially more than 1.0% by weight of the total weight of the unexpanded vermiculite, the textile glass filaments and the gypsum plaster of the raw batch.

4. A plaster cast consisting essentially of set gypsum plaster, said set gypsum plaster containing dispersed therein high grade comminuted unexpanded vermiculite of about minus 28 mesh commercial grading and textile glass filaments, said high grade comminuted unexpanded vermiculite comprising not substantially less than 3½% and not substantially more than 7½% by weight of the total weight of the unexpanded vermiculite, the textile glass filaments and the gypsum plaster of the raw batch, said textile glass filaments having a length not substantially less than one quarter inch and not substantially greater than one inch and being distributed substantially uniformly as individual filaments throughout said set gypsum plaster and comprising not substantially less than .02% and not substantially more than 1.0% by weight of the total weight of the unexpanded vermiculite, the textile glass filaments and the gypsum plaster of the raw batch.

5. In a plaster board, a body member having a paper cover on at least one face thereof, said body member consisting essentially of set gypsum plaster, said set gypsum plaster containing dispersed therein comminuted unexpanded vermiculite and textile glass filaments, the particular degree of comminution and the grade and amount of said vermiculite being such that when the cast made from such mixture is heated to a high temperature the vermiculite in the cast shall have about the same total amount of expansion as would 3½% to 7½% of high grade vermiculite of minus 28 mesh commercial grade, said textile glass filaments having a length not substantially less than one quarter inch and not substantially greater than one inch and being distributed substantially uniformly as individual filaments throughout said set gypsum plaster and comprising not substantially less than .02% and not substantially more than 1.0% by weight of the total weight of the unexpanded vermiculite, the textile glass filaments and the gypsum plaster of the raw batch.

6. In a plaster board, a body member having a paper cover on at least one face thereof, said body member consisting essentially of set gypsum plaster, said set gypsum plaster containing dispersed therein high grade comminuted unexpanded vermiculite of about minus 28 mesh commercial grading and textile glass filaments, said high grade comminuted unexpanded vermiculite comprising not substantially less than 3½% and not substantially more than 7½% by weight of the total weight of the unexpanded vermiculite, the textile glass filaments and the gypsum plaster of the raw batch, said textile glass filaments having a length not substantially less than one quarter inch and not substantially greater than one inch and being distributed substantially uniformly as individual filaments throughout said set gypsum plaster and comprising not substantially less than .02% and not substantially more than 1.0% by weight of the total weight of the unexpanded vermiculite, the textile glass filaments and the gypsum plaster of the raw batch.

References Cited in the file of this patent

UNITED STATES PATENTS

| | | |
|---|---|---|
| 2,425,883 | Jackson | Aug. 19, 1947 |
| 2,526,066 | Croce | Oct. 17, 1950 |

FOREIGN PATENTS

| | | |
|---|---|---|
| 587,556 | Great Britain | Apr. 29, 1947 |
| 830,030 | France | May 2, 1938 |